(12) United States Patent
Athalye et al.

(10) Patent No.: US 10,012,371 B2
(45) Date of Patent: Jul. 3, 2018

(54) SOLID STATE LIGHTING APPARATUS INCLUDING ISOLATED SOLID STATE LIGHTING DRIVER CIRCUITS AND RELATED SOLID STATE LIGHTING COVERS, HOUSINGS, AND LENSES

(71) Applicant: Cree, Inc., Durham, NC (US)

(72) Inventors: Praneet Athalye, Morrisville, NC (US); Randall Levy Bernard, Cary, NC (US); Yaote Huang, Morrisville, NC (US); Kevin Gierl, Cary, NC (US)

(73) Assignee: Cree, Inc., Durham, NC (US)

( * ) Notice: Subject to any disclaimer, the term of this patent is extended or adjusted under 35 U.S.C. 154(b) by 203 days.

(21) Appl. No.: 14/281,173

(22) Filed: May 19, 2014

(65) Prior Publication Data

US 2014/0254199 A1    Sep. 11, 2014

Related U.S. Application Data

(63) Continuation-in-part of application No. 13/461,384, filed on May 1, 2012, now Pat. No. 8,757,863.

(51) Int. Cl.
| | |
|---|---|
| *H01R 33/00* | (2006.01) |
| *F21V 23/00* | (2015.01) |
| *F21V 23/06* | (2006.01) |
| *H01R 13/66* | (2006.01) |
| *H01R 33/22* | (2006.01) |
| *H05B 33/08* | (2006.01) |

(Continued)

(52) U.S. Cl.
CPC ............ *F21V 23/001* (2013.01); *F21K 9/238* (2016.08); *F21V 23/006* (2013.01); *F21V 23/008* (2013.01); *F21V 23/06* (2013.01); *H01R 13/6658* (2013.01); *H01R 33/22* (2013.01); *H05B 33/0803* (2013.01); *F21Y 2115/10* (2016.08); *Y02B 20/19* (2013.01)

(58) Field of Classification Search
CPC .... F21V 23/001; F21V 23/006; G02B 6/0043
See application file for complete search history.

(56) References Cited

U.S. PATENT DOCUMENTS

| | | | |
|---|---|---|---|
| 4,150,250 A | * | 4/1979 | Lundeberg ............. H02G 3/065 174/655 |
| 5,065,299 A | | 11/1991 | Cohen |
| 5,980,072 A | | 11/1999 | Zirkle |

(Continued)

OTHER PUBLICATIONS

International Preliminary Report on Patentability Corresponding to International Application No. PCT/US2013/038850; dated Nov. 13, 2014; 12 Pages.

(Continued)

*Primary Examiner* — Evan Dzierzynski
(74) *Attorney, Agent, or Firm* — Myers Bigel, P.A.

(57) ABSTRACT

A solid state lighting apparatus can include an electrical connector that is configured to couple to a standardized electrical fixture, where the electrical connector provides a recess therein. A cover can be coupled to the electrical connector to cover the recess and a solid state lighting driver circuit can be located beneath the cover. A solid state lighting housing, that is separate from the electrical connector and the cover, can be configured to house a solid state light emitting device and at least one flexible wire can electrically couple the solid state lighting driver circuit to the solid state light emitting device.

41 Claims, 6 Drawing Sheets

(51) Int. Cl.
*F21K 9/238* (2016.01)
*F21Y 115/10* (2016.01)

(56) References Cited

U.S. PATENT DOCUMENTS

| | | | |
|---|---|---|---|
| 5,982,110 A | 11/1999 | Gradzki | |
| 6,095,671 A | 8/2000 | Hutain | |
| 7,213,940 B1 | 5/2007 | van de Ven | |
| 8,742,671 B2 | 6/2014 | van de Ven et al. | |
| 2004/0066142 A1 | 4/2004 | Stimac et al. | |
| 2004/0212993 A1* | 10/2004 | Morgan | F21V 33/004 362/231 |
| 2005/0128751 A1* | 6/2005 | Roberge | F21K 9/00 362/276 |
| 2006/0094285 A1* | 5/2006 | Newell | H01R 13/652 439/446 |
| 2006/0146527 A1 | 7/2006 | VanderSchult | |
| 2006/0232974 A1 | 10/2006 | Lee et al. | |
| 2008/0232116 A1* | 9/2008 | Kim | F21S 8/026 362/365 |
| 2009/0161352 A1* | 6/2009 | MacKin | F21V 19/04 362/217.02 |
| 2010/0165632 A1* | 7/2010 | Liang | F21V 3/00 362/294 |
| 2010/0220468 A1* | 9/2010 | Pearson | A01K 27/004 362/192 |
| 2010/0238644 A1* | 9/2010 | Huang | F21S 6/003 362/33 |
| 2011/0080740 A1* | 4/2011 | Allen | F21V 3/00 362/294 |
| 2011/0080742 A1* | 4/2011 | Allen | F21V 3/00 362/294 |
| 2011/0096562 A1* | 4/2011 | Lambert | B60Q 1/20 362/545 |
| 2011/0193491 A1 | 8/2011 | Choutov et al. | |
| 2011/0211351 A1 | 9/2011 | van de Ven et al. | |
| 2012/0224395 A1 | 9/2012 | Cao | |

OTHER PUBLICATIONS

Notification of the Transmittal of the International Search Report and the Written Opinion of the International Searching Authority, or the Declaration, PCT/US2013/038850, dated Aug. 27, 2013, 13 pages.

* cited by examiner

US 10,012,371 B2

SOLID STATE LIGHTING APPARATUS INCLUDING ISOLATED SOLID STATE LIGHTING DRIVER CIRCUITS AND RELATED SOLID STATE LIGHTING COVERS, HOUSINGS, AND LENSES

CROSS-REFERENCE TO RELATED APPLICATIONS

This application claims priority to and is a Continuation-in-Part of U.S. patent application Ser. No. 13/461,384, filed on May 1, 2012, entitled Solid State Lighting Apparatus With Electrical Connectors Including Portions of Drivers, the entire disclosure of which is hereby incorporated herein by reference. This application is also related to U.S. patent application Ser. No. 29/491,189; entitled LED Recessed Light Apparatus, filed concurrently with the present application on May 19, 2014, the entire disclosure of which is hereby incorporated herein by reference.

BACKGROUND

Because a large portion of electricity in the United States is used for lighting, there are ongoing efforts to provide lighting that is more energy efficient. Solid state light emitting devices (e.g., light emitting diodes) are receiving attention because light can be generated more efficiently than using conventional incandescent or fluorescent light bulbs. Moreover, lifetimes of solid state light emitting devices may be significantly longer those of incandescent or fluorescent light bulbs.

Some conventional light bulbs generally operate using 120 volt ac electrical power provided through, for example, an Edison fixture configured to receive an Edison screw fitting on conventional light bulbs, whereas solid state light emitting devices may utilize dc power.

SUMMARY

Embodiments according to the invention can provide a solid state lighting apparatus including isolated solid state lighting driver circuit and related solid state lighting cover, housings, and lenses. Pursuant to these embodiments, a solid state lighting apparatus can include an electrical connector that is configured to couple to a standardized electrical fixture, where the electrical connector provides a recess therein. A cover can be coupled to the electrical connector to cover the recess and a solid state lighting driver circuit can be located beneath the cover. A solid state lighting housing, that is separate from the electrical connector and the cover, can be configured to house a solid state light emitting device and at least one flexible wire can electrically couple the solid state lighting driver circuit to the solid state light emitting device.

In some embodiments according to the invention, a solid state lighting apparatus can include an electrical connector that is configured to couple to a standardized electrical fixture, where the electrical connector provides a recess therein. A cover can eb coupled to the electrical connector to cover the recess, where the cover can include an opening. A solid state lighting driver circuit can be located beneath the cover to prevent outside access to the solid state lighting driver circuit to meet a standardized electrical safety certification. At least one flexible wire can be electrically coupled to the solid state lighting driver circuit and pass through the opening.

In some embodiments according to the invention, the cover is configured to electrically isolate the solid state lighting driver circuit from a handler. In some embodiments according to the invention, the cover can further include at least one feature that is configured to promote releasably coupling the solid state lighting apparatus to/from the standardized electrical fixture. In some embodiments according to the invention, the at least one feature can be at least one raised portion of an outer surface of the cover. In some embodiments according to the invention, the at least one feature can be a roughened outer surface of the cover.

In some embodiments according to the invention, the opening in the cover is sized to accommodate the insertion of the at least one flexible wire through the opening. In some embodiments according to the invention, the apparatus can further include an interface that is configured to irreversibly couple the electrical connector to the cover during assembly of the solid state lighting apparatus. In some embodiments according to the invention, the interface can provide latching, adhering, and/or fusing the cover to the electrical connector. In some embodiments according to the invention, the interface can be configured to prevent touching of the solid state lighting driver circuit from outside the apparatus to meet a standardized electrical safety certification. In some embodiments according to the invention, the solid state lighting driver circuit can be entirely within a space formed by the cover and the recess.

DETAILED DESCRIPTION OF EMBODIMENTS ACCORDING TO THE INVENTION

Figure 1:
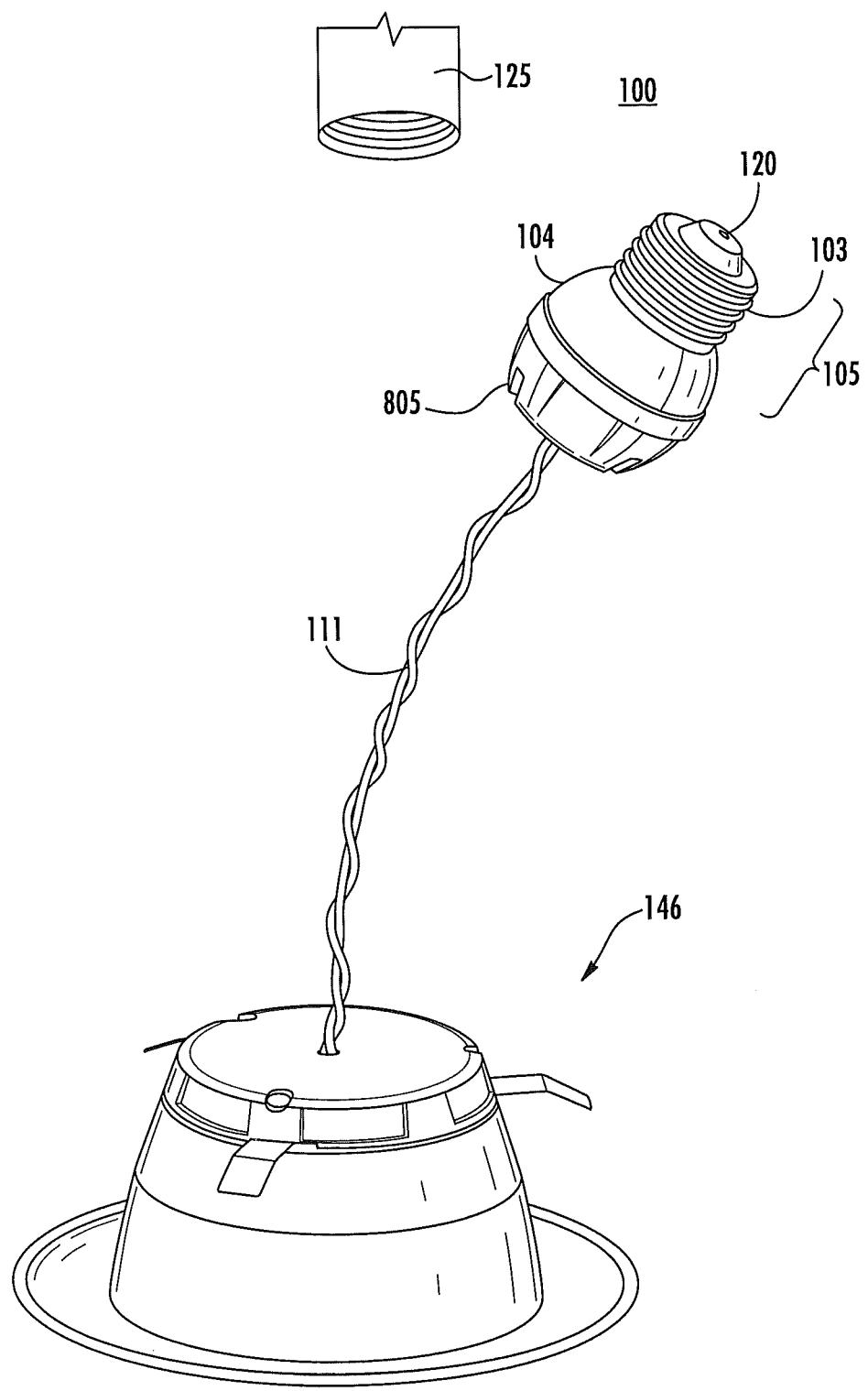
FIG. 1 is a schematic illustration of a solid state lighting apparatus including an electrical connector coupled to a solid state lighting housing by a flexible wire in some embodiments according to the invention.

Embodiments of the present inventive subject matter now will be described more fully hereinafter with reference to the accompanying drawings, in which embodiments of the present inventive subject matter are shown. This present inventive subject matter may, however, be embodied in many different forms and should not be construed as limited to the embodiments set forth herein. Rather, these embodiments are provided so that this disclosure will be thorough and complete, and will fully convey the scope of the present inventive subject matter to those skilled in the art. Like numbers refer to like elements throughout.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing ac incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

As described herein in greater detail, in some embodiments according to the invention, a solid state lighting driver circuit can be electrically coupled to, but separated from, a solid state light emitting device. For example, in some embodiments according to the invention, solid-state lighting driver circuit can be located within a covered recess of an electrical connector, whereas the solid-state lighting device can be remotely located in a solid-state lighting housing that is separated from the covered electrical connector. In such arrangements, the solid-state lighting driver circuit can be electrically coupled to a solid-state lighting device by a flexible wire. Use of the flexible wire can promote ease of installation of the lighting apparatus by allowing the electrical connector to be installed in a standardized electrical fixture without simultaneously manipulating the solid-state lighting housing. Rather, the solid-state lighting housing may be installed separately from the electrical connector. Furthermore, heat management may be improved by housing the solid-state lighting driver circuit and the solid-state lighting device in separate remote structures.

It will be further understood that in some embodiments according to the invention, the cover on the electrical connector can be configured to electrically isolate the solid-state lighting driver circuit within the covered recess so as to prevent a shock from touching the solid-state driver circuit (e.g. during installation or removal of the electrical connector from a powered fixture). Still further, in some embodiments according to the invention, an interface can be configured to provide for the irreversible coupling of the cover to the electrical connector so that, once assembled, the cover and the electrical connector may not be readily separated from one another.

In some embodiments according to the invention, the cover can include at least one feature configured to promote the installation/removal of the electrical connector. For example, in some embodiments according to the invention, the surface of the cover can include a raised portion, such as a rib, to provide an ergonomic interface for a handler to install the electrical connector in a corresponding standardized fixture.

In some embodiments according to the invention, the solid-state lighting housing can include a "wet-location" compliant lens that meets a standardized electrical safety certification (e.g. UL Certification) indicating resistance to the intrusion of a liquid into an interior space of the housing which would otherwise contact electrical components housed behind the lens, such as a solid-state light emitting device, thereby creating a potential hazard. For example, in some embodiments according to the invention, the wet-location compliant lens may be utilized in settings where a fire suppression system may spray water onto the housing.

FIG. 1 is a schematic illustration of a solid state lighting apparatus 100 in some embodiments according to the invention. According to FIG. 1, a standardized electrical fixture 125 can be provided with an ac voltage signal, typically found in a commercial or residential electrical installation. For example, in some embodiments according to the invention, the ac voltage signal is 110 volts ac or 220 volts ac. Other voltage levels may be used.

The standardized electrical fixture 125 can be a fixture designated as an E26 Edison style fixture (sometimes referred to using the IEC Standard Sheet Designation 7004-21A-2) which allows a corresponding portion of the solid state lighting apparatus 100 to be releasably coupled to the standardized electrical fixture 125, by screwing the apparatus 100 into (or out of) the standardized electrical fixture 125.

It will be understood that the standardized electrical fixture 125 may be any standardized electrical fixture 125 that complies with any standardized electrical specification available throughout the world, which allows the solid state lighting apparatus 100 to be releasably coupled thereto. For example, in some embodiments according to the invention, the standardized electrical fixture 125 can be an E5, E10, E11, E14, E17, E27, E29, E39, E40, or the like. In other embodiments according to the invention, the standardized electrical fixture 125 can be a so called "bayonet style" such as a B15d, BA15d, BA15s, BA20d, B21s-4, B22d, B24s-3, GU10, GZ10, G24, or the like.

It will further be understood that the term "releasably coupled" includes any type of action that allows the apparatus 100 to be coupled to (and decoupled from) the standardized electrical fixture 125, by a handler, without the need for specialized tools and/or procedures in keeping the accepted practices and regulations. For example, it will be understood that the term "releasably coupled" includes actions (including the opposing actions) such as sliding, latching, screwing, twisting, pushing, and clamping.

According to FIG. 1 an electrical connector 105 can be configured to releasably couple to the standardized electrical fixture 125. As shown in FIG. 1, the electrical connector 105 can include multiple components such that any combination of those components can be considered the electrical connector 105. For example, in some embodiments according to the invention, the electrical connector 105 includes a base portion 103 having an exterior surface that is configured to screw in and out of the standardized electrical fixture 125. In some embodiments according to the invention, the electrical connector 105 further includes an extension 104 that is coupled to the base portion 103. In some embodiments, the extension 104 and the base portion can be a unitary piece. In still other embodiments, the extension 104 and the base portion 103 can be separate pieces that are coupled together. It will be further understood that in some embodiments, other components can also be included as part of the electrical connector 105.

Figure 3:
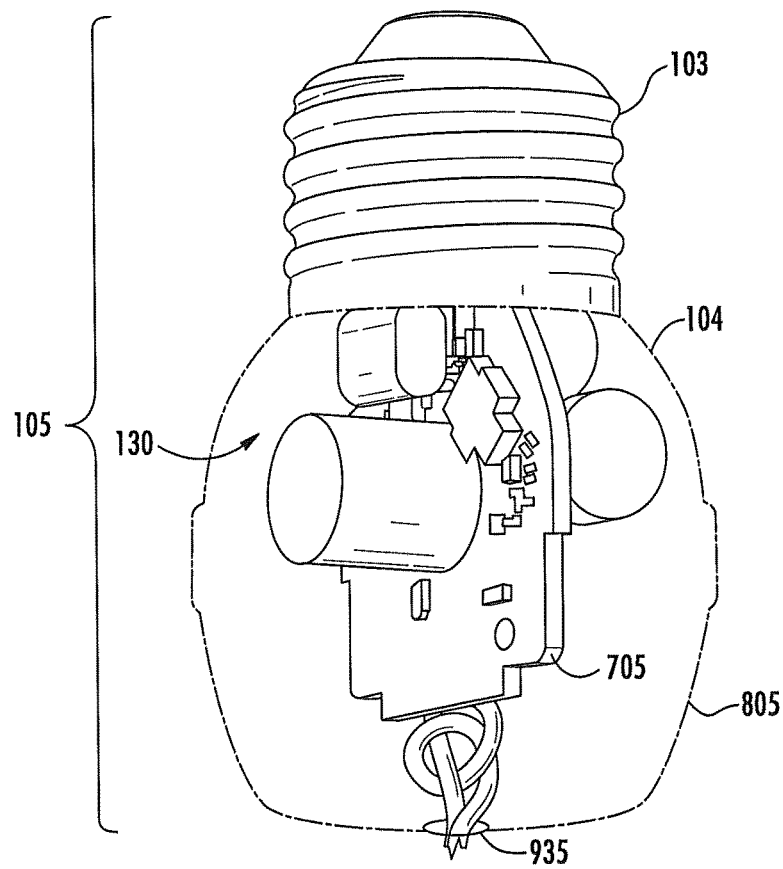
FIG. 3 is a perspective view of an electrical connector irreversibly coupled to a cover to electrically isolate a solid state lighting driver circuit from a handler in some embodiments according to the invention.
Figure 8:
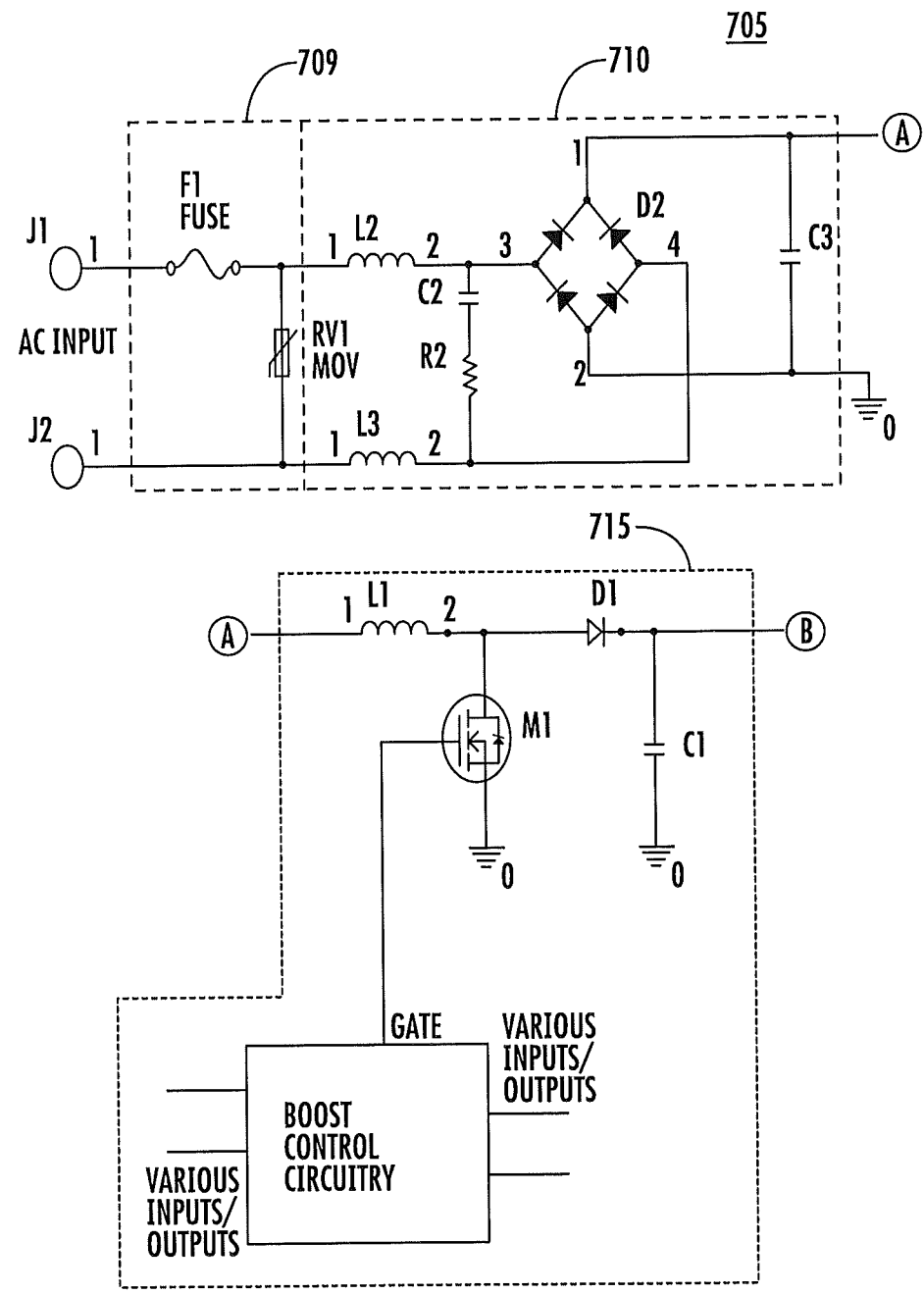
FIG. 8 is a circuit schematic illustrating a solid state lighting driver circuit including a protective circuit stage, and an EMI filter and rectifier circuit stage, and a boost circuit stage in some embodiments according to the invention.

As further shown in FIG. 1, the electrical connector is irreversibly coupled to a cover 805 to form an interior space of the electrical connector 105, which can be configured to accommodate the inclusion of a solid state lighting driver circuit 705, such as that shown schematically in FIG. 8 and in a perspective view in FIG. 3. Once the electrical connector 105 and the cover 805 are irreversibly coupled to one another, the solid state lighting driver circuit 705 is electrically isolated within the interior space so that a handler of the electrical connector 105 is protected from an electrical shock which otherwise may occur if the handler were to inadvertently touch the driver circuit 705 or other powered components within the interior space. For example, when the solid state lighting driver circuit 705 is enclosed, a handler can manipulate the electrical connector 105 without coming into contact with any powered components electrically isolated within the space beneath the cover 805 in the recess of the electrical connector 105.

The electrical connector 105 and the cover 805 can be made of a non-conductive material, such as a blending of polybutylene terephthalate and polycarbonate. In some embodiments according to the invention, the electrical connector 105 and the cover 805 can be opaque such that the interior space beneath the cover 805 is not visible to an outside observer. In some embodiments according to the invention, the electrical connector 105 and the cover 805 can be different materials.

Still referring to FIG. 1, a flexible wire 111 couples the electrical connector 105 to a remotely positioned separate solid state lighting apparatus 146 in some embodiments according to the invention. For example, the flexible wire 111 can mechanically couple the electrical connector 105 to the apparatus 146 such that the weight of the apparatus 146 may be fully borne by the connection of the flexible wire 111 to the electrical connector 105. Accordingly, during installation a handler may focus on the insertion of the electrical connector 105 in the standardized fixture 125 while allowing the apparatus 146 to hang freely without damaging the apparatus 100. Once the electrical connector 105 is installed, the handler may then secure the apparatus 146 to complete the installation of the solid state lighting apparatus 100.

It will be further understood that in some embodiments according to the invention, the apparatus 100 can include a strain relief feature that is configured to support the weight of the apparatus 146 when hanging freely, as described herein. For example, in some embodiments according to the invention, the strain relief feature can be a knot tied in the flexible wire 111 positioned beneath the cover 805 and sized to prevent the knot from passing through an opening 935 in the cover 805 when bearing the weight of the apparatus 146, as shown for example, in FIG. 3. In some embodiments according to the invention, the strain relief feature can be a knot tied in the flexible wire 111 positioned inside the solid state lighting housing of the apparatus 146. In some embodiments according to the invention, the strain relief feature can be separate from the flexible wire 111. In still other embodiments, a combination of strain relief features can be used.

It will be understood that, in some embodiments according to the invention, the solid state lighting apparatus 146 includes a solid state light emitting device (such as a Light Emitting Diode) that is electrically coupled to the flexible wire 111. It will be understood, therefore, that the solid state light emitting device in the apparatus 146 can operate responsive to power provided by the solid state lighting driver circuit 705 via the flexible wire 111.

It will be understood that the flexible wire can be any electrical conductor that provides sufficient electrical conductivity between the solid state lighting driver circuit 705 and the solid state light emitting device at the current and voltage levels called for by operation of the apparatus and permitted by a standardized electrical safety certification for the lighting apparatus 100.

Figure 2:
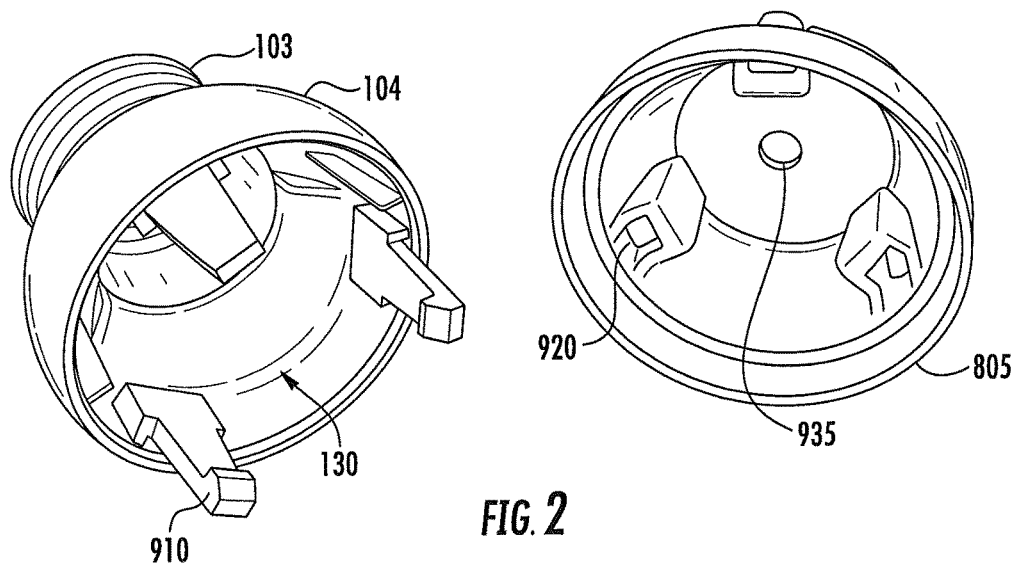
FIG. 2 is a perspective view of an apparatus including an electrical connector configured to irreversibly coupled to a cover in some embodiments according to the invention.

FIG. 2 is a perspective view of the electrical connector 105 before being irreversibly being coupled to the cover 805 in some embodiments according to the invention. According to FIG. 2, the electrical connector 105 includes a recess 130 therein in which electrical components and conductors may be placed to support operation and installation of the solid state lighting driver circuit 705 in some embodiments according to the invention.

Further according to FIG. 2, the cover 805 can be irreversibly coupled to the electrical connector 105 to form an interior space that extends from beneath the cover 805 to the opposite side of the recess 130. The interior space is sized and configured to accommodate the inclusion of the solid state lighting driver circuit 705. The cover 805 can include an opening 935 that is sized to accommodate the insertion of the flexible wire 111 therethrough and electrically couple to the solid state lighting driver circuit 705.

The electrical connector 105 can include male latching features 910 that are configured to protrude into corresponding female latching features 920 located in the interior space beneath the cover 805. It will be understood that the position of the male and female latching features 910/920 may be reversed in some embodiments according to the invention. When the male and female latching features 910/920 are engaged within one another during assembly, the electrical connector 105 and the cover 805 are irreversibly coupled to one another so as to electrically isolate the solid state lighting driver circuit 705 within the space beneath the cover 805. Accordingly, the male and female latching features 910/920 form an interface between the electrical connector 105 and the cover 805 so that the two structures are irreversibly coupled to one another. Furthermore, other types of features may be used to provide the interface that promotes irreversible coupling. For example, in some embodiments according to the invention, the interface can be provided by welding (such as ultrasonically) the cover 805 to the electrical connector 105. In some embodiments according to the invention, the interface for the irreversible coupling of the structures is provided by gluing or otherwise adhering the cover 805 to the electrical connector 105. Other types of interfaces may also be used to provide for the irreversible coupling of the cover 805 to the electrical connector 105 as described herein.

As used herein, the term "irreversibly coupled" (and variations thereof) can include coupling of the cover 805 to the electrical connector 105 such that the coupling of the two structures may not simply be reversed to disassemble the structure and leave the components undamaged. Furthermore, "irreversibly coupled" can also include embodiments where a barrier to disassembly is provided by the coupling, such by obscuring access to the features that provide for the coupling or provide significant mechanical resistance to disassembly such that the structure may not be disassembled without the use of a specialized tool. For example, according to FIG. 2, the cover 805 is irreversibly coupled to the electrical connector 805 by aligning the male and female latching features 910/920 and pushing the cover onto the electrical connector 105 until the latching features 910/920 engage with one another. Once the cover 805 is irreversibly coupled to the electrical connector 105, the solid state lighting driver circuit 1070 cannot be exposed again by pulling the cover 805 away from the electrical cover 105 in the reverse direction, thereby making the assembly process not reversible.

Still further, it will be understood that the term "irreversibly coupled" include interfaces where the assembled structure can only be disassembled by damaging at least one of the components of the structure. In other words, in some embodiments according to the invention, if the cover 805 were to be pulled apart from the electrical connector 105 after irreversible coupling, the cover 805 or the electrical connector 105 would be damaged. In still other embodiments according to the invention, irreversible coupling includes configurations where disassembling of the structure would leave an indication that disassembly occurred. In still other embodiments according to the invention, the term "irreversible coupling" includes interfaces or structures that allow the cover 805 and the electrical connector 105 to enclose voltages/currents in such a way to provide compliance with a standardized electrical safety certification, such as Underwriter's Laboratory or other worldwide safety certification organizations. Accordingly, once the solid state lighting driver circuit 1070 is enclosed within the space under the cover 805 that is irreversibly coupled to the electrical connector 105, the driver circuit 705 is electrically isolated within the space beneath the cover 805 and thereby a handler is protected from shock when touching the electrical connector 105 during, for example, installation of the lighting apparatus 100. Furthermore, the "irreversibly coupled" are configured to remained coupled throughout the specified lifetime of the apparatus.

Figure 4:
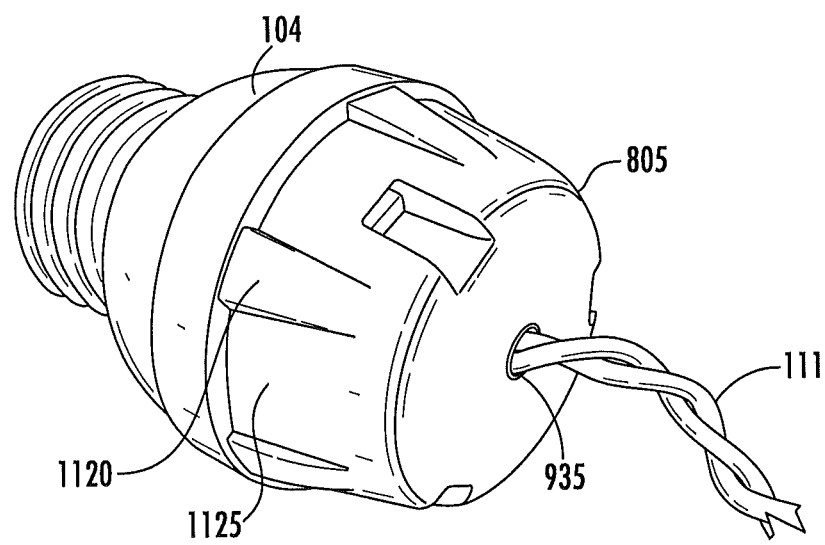
FIG. 4 is a perspective view of an apparatus including an electrical connector irreversibly coupled to a cover having an opening therein through which a flexible wire passes in some embodiments according to the invention.

FIG. 4 is a perspective view of the electrical connector 105 irreversibly coupled to the cover 805 including the opening 935 therein through which the flexible wire 111 protrudes, in some embodiments according to the invention. According to FIG. 4, the cover 805 also includes at least one feature that is configured to promote installation/removal of the electrical connector 105 from the standardized fixture 125. For example, in some embodiments according to the invention, a rib 1120 can be on the cover 805 to promote ergonomic handling of the electrical connector 105. The rib 1120 can be raised relative to a surface 1125 of the cover 805. Accordingly, during installation or removal, a handler may grip the cover 805 using the rib 1120.

In some embodiments according to the invention, the installation feature can be provided by a roughened portion of the outer surface 1125 of the cover 805 to improve handling of the electrical connector 105 during installation or removal from the standardized fixture 125. In some embodiments according to the invention, a combination of features may be included on the cover 805. In still other embodiments according to the invention, the at least one feature can be included on some portion of the electrical connector 105. In some embodiments according to the invention, a combination of features can be included on the cover 805 and on the electrical connector 105.

Figure 5:
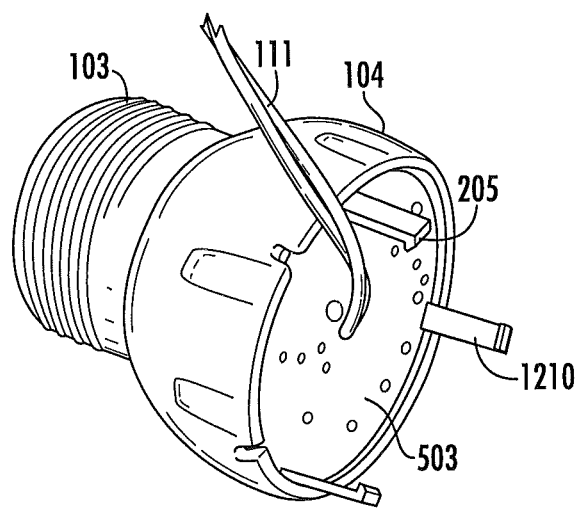
FIG. 5 is a perspective view of an apparatus including an electrical connector having a circuit board included in a recess of the electrical connector in some embodiments according to the invention.

FIG. 5 is a perspective view of the electrical connector 105 including a circuit board 503 in the recess 130 in some embodiments according to the invention. According to FIG. 5, the printed circuit board 503 is configured to allow mounting of the solid state lighting driver circuit 705 in the recess beneath the cover 805. In other embodiments according to the invention, the solid state lighting driver circuit 705 may be included on the circuit board 530, so that the driver circuit 705 may have a lower profile within the interior. In still other embodiments according to the invention, the solid state lighting driver circuit 705 can be included on a reverse side of the circuit board 503 facing away from the opening of the recess of the electrical connector 105, so that driver circuit 705 may be entirely within the electrical connector 105.

Figure 6A:
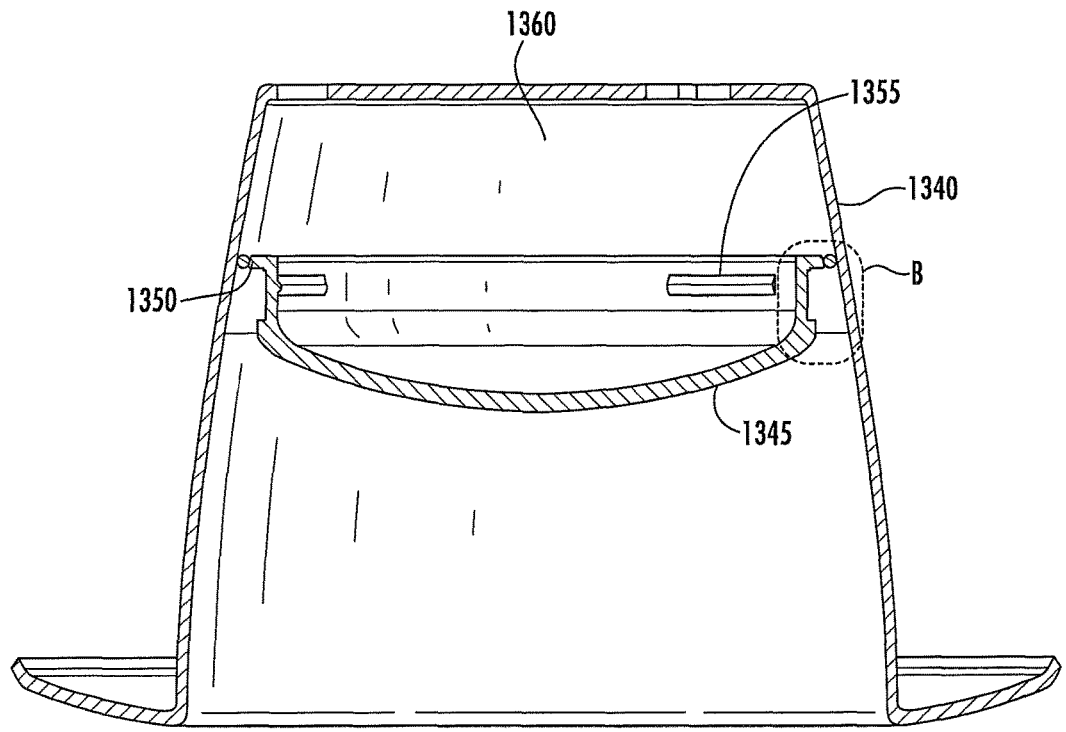
FIG. 6A is a cross-sectional view of a solid state lighting apparatus including a solid state lighting housing with a wet-location compliant lens mounted to an interior of the housing in some embodiments according to the invention.

FIG. 6A is a cross-sectional view of a portion of the lighting apparatus 146 including the solid state lighting housing 1340 configured to allow the mounting therein of a wet-location compliant lens 1345 in some embodiments according to the invention. According to FIG. 6A, the wet-location compliant lens 1345 is transmissive to light generated by the solid state light emitting devices in the lighting apparatus 146 and can be formed of a polycarbonate material which is resistant to the transfer of liquid through the lens 1345 into an interior region 1360 behind the lens 1345 in which the solid state light emitting device may be housed.

Figure 6B:
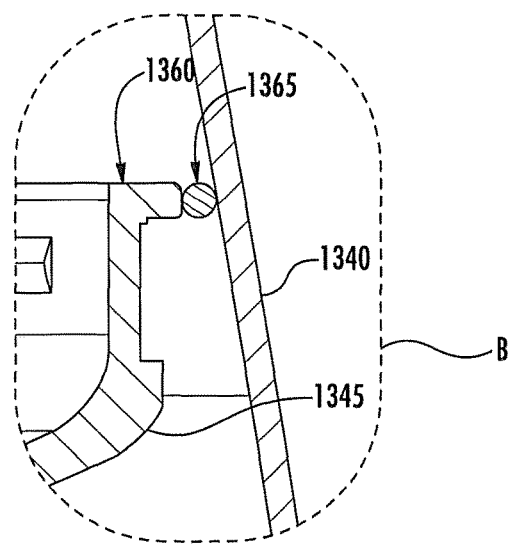
FIG. 6B is a detailed cross-sectional view of a flange of the wet-location compliant lens and a compressible seal configured for use therewith in some embodiments according to the invention.

As further shown in FIG. 6A, the wet-location compliant lens 1345 can include an outer flange 1350 that protrudes from the side of the lens 1345 and is configured to come into close contact with an interior surface of the housing 1340. The outer flange can therefore provide additional resistance to the invasion of liquid into the interior region 1360 in some embodiments according to the invention. In some embodiments according to the invention, the outer flange 1350 protrudes from a side of the lens 1345 by about 2 mm to about 4 mm. As further shown in a detailed view in FIG. 6B, the outer flange 1350 can be spaced apart from the interior surface to accommodate the insertion of a compressible seal 1365 between an outer edge of the outer flange and the interior surface of the housing 1340 to further reduce the invasion of liquid into the region 1360. It will be understood that the term "wet-location compliant" includes configurations and materials used for the lens 1345 which are sufficient so that the apparatus 100 meets a relevant national, international, or regional standardized electrical safety certification (e.g. UL Certification) indicating resistance to the intrusion of a liquid into an interior space of the housing which would otherwise contact electrical components housed behind the lens.

As further shown in FIG. 6A, the housing 1340 can include a plurality of vents 1355 that are configured to promote the transfer of heat away from the solid state light emitting devices in the housing 1340 in some embodiments according to the invention. In some embodiments according to the invention, each of the vents 1355 can have an opening area of about 4 mm$^2$. In still further embodiments according to the invention, the vents 1355 may be eliminated from the housing 1340.

Figure 7:
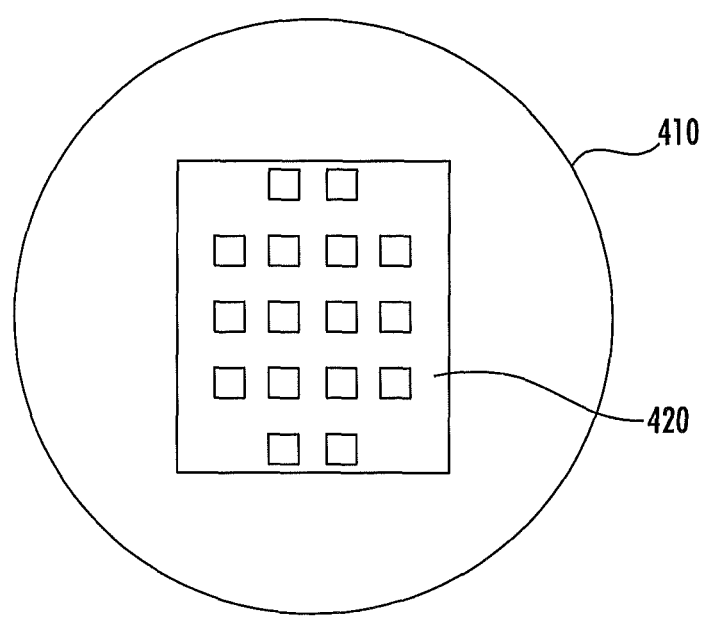
FIG. 7 is a plan view of an array of solid state light emitting devices integrated on a circuit board and configured for mounting in the housing of FIG. 6A in some embodiments according to the invention.

FIG. 7 is a plan view of an array of solid state light emitting devices integrated on a circuit board and configured for mounting in the housing of FIG. 6A in some embodiments according to the invention. The LEDs in the array 420 can be "chip-on-board" (COB) LEDs, which are mounted on a board 410 configured for mounting in the housing 1340 inside the interior 1360. Accordingly, the chip-on-board LEDs can be mounted on the board 410 without additional packaging which otherwise would be included if those LEDs were to be used in other applications where, for example, the LED is provided on a submount, an intervening substrate, or other chip carrier to which the LED is mounted etc. Such other approaches are described, for example, in commonly assigned co-pending U.S. application Ser. No. 13/192,755, where for example, LEDs can be located on a submount, located on a lower substrate to provide a stacked arrangement, the disclosure of which is incorporated herein by reference. It will also be understood that the LEDs in the array can be packaged LED devices in the place of the COB LEDs, in some embodiments according to the invention. For example, in some embodiments according to the invention, the LEDs can include XML-HV LEDs or XTE-HV LEDs available from Cree, Inc. of Durham N.C.

It will be understood that the term "mounted on" as used herein can includes configurations where the component (such as a chip-on-board LED) is physically connected to the board 410 without the use of intervening submounts, substrates, carriers, or other surfaces such as those described in the above-referenced commonly assigned U.S. application Ser. No. 13/192,755. Components that are described as being "mounted on" a substrate can be on the same surface of a substrate, or on opposing surfaces of the same substrate. For example, components that are placed and soldered on the same substrate during assembly can be described as being "mounted on" that substrate.

The board 410 can be made of materials such a polyimides and polyesters. The board 410 can be a flexible printed circuit board, which can allow the board to take a non-planar or curved shape, with the LED chips also being arranged in a non-planar manner. In some embodiments according to the invention, the board 410 can be a flexible printed board such as a Kapton® polyimide available from DuPont. In some embodiments according to the invention, the board 410 can be a standard FR-4 PCB.

The size of the board 410 can vary depending on different factors, such as the size and number of the LEDs mounted thereon. For example, in some embodiments the board 410 can be approximately 24 mm on each side. In some embodiments according to the invention, the components on the substrate can present a height of about 2.5 mm. Other dimensions can also be used for the board 410.

It will be understood that the board 410 can be utilized in combination with heat sink structures mounted to, or incorporated within, the board 410 to provide sufficient heat transfer away from the apparatus 100. In some embodiments according to the invention, a flexible heat transfer tape, such as GRAFIHX™, available from GraphTech, International of Lakewood, Ohio, can be used to attach a heat sink to the board 410. The heat sink can be any thermally efficient material sufficient to conduct heat away from the board 410. For example, the heat sink can be a metal, such as aluminum. In some embodiments according to the invention, the heat sink is graphite. In some embodiments according to the invention, the heat sink includes reflective surfaces to improve light extraction.

In some embodiments according to the invention, the LEDs in the array 420 can be arranged according to a particular pattern in approximately the center of the board 410. It will be understood, however, that the LEDs can be arranged in any way that is suitable to provide the light output desired from the solid state lighting apparatus 100. For example, the LEDs can be arranged in an approximately circular array, a rectangular array, a random array, or a semi-random array.

In some embodiments according to the present invention, LED array 420 can include LEDs that emit light of the same color or of different colors (e.g. red, green and blue LED chips or subgroups, white LED and red LED chips or subgroups, etc.) Techniques for generating white light from a plurality of discrete light sources to provide desired CRI at the desired color temperature have been developed that utilize different hues from different discrete light sources. Such techniques are described in U.S. Pat. No. 7,213,940, entitled "Lighting Device and Lighting Method", which is hereby incorporated herein by reference.

FIG. 8 is a schematic diagram of a solid state lighting driver circuit 705 including a protective circuit stage 709 coupled to an EMI filter and rectifier circuit stage 710, coupled to a boost circuit stage 715 in some embodiments according to the invention. It will be understood that, in some embodiments according to the invention, all stages of the driver circuit 705 are located within the space formed by the cover 805 being coupled to the electrical connector 105.

According to FIG. 8, an ac voltage signal across terminals J1/J2 can be about 120 V ac at about 60 Hz. The ac voltage signal is input to the protective circuit stage 709 having a fuse F1 that protects the driver circuit from short circuits or excessive currents that may otherwise be drawn from the ac voltage signal. RV1 is a metal oxide varistor (MOV) that is provided to clamp short duration voltage transients may occur on the line (such as when a lightning strike occurs) so that the remaining circuitry is not subjected to excessive voltages. In operation, when a long duration voltage transient occurs on the ac line, the RV1 MOV may fail due to the excessive energy dissipated in it. If the RV1 MOV fails, an internal short may occur resulting in excessive current being drawn from the ac line, which may cause the fuse F1 to open, which renders the apparatus 100 inoperable, although the remainder of the circuitry may be undamaged.

The output of the protective circuit stage 709 is coupled to the EMI filter and rectifier circuit stage 710, which can provide an output voltage of about 180 Volts dc so that the power level for the circuit 705 is about 10 W to about 20 W. It will be understood, however, that other voltage and power levels can be used. The EMI filter includes inductors L2, L3 and capacitor C3 along with an EMI filter damping circuit that includes the C2-R2 combination. It will be understood that other configurations of the EMI filter circuit and the EMI filter damping circuit may be used. Furthermore, in some embodiments according to the invention, components included in the EMI filter circuit and in the EMI filter damping circuit can be placed before, after, or on both sides of the rectifier D2.

Still referring to the FIG. 8, the output of the EMI filter and rectifier circuit stage 710 is coupled to the boost circuit stage 715, which includes a boost inductor L1, a switch M1, a boost diode D1, and a storage capacitor C1. Boost control circuitry receives various feedforward and feedback inputs and provides a pulse-width-modulated (PWM) switching signal to the gate terminal of the switch M1 so that the switch M1 can be turned on/off. The switching frequency of the switch M1 may be between about 20 kHz to about 1 MHz or more. In some embodiments according to the invention, the switching frequency of the switch M1 may be about 100 kHz.

It will be understood that the switching of the switch M1 can generate a current ripple in inductor L1 which may need to be filtered in order to satisfy EMI requirements. In particular, when the switch M1 is turned on, the current in the inductor L1 ramps up. When the switch M1 is turned off the energy stored in the inductor L1 is delivered to the output capacitor C1 through diode D1. With power factor correction, the average input current may be shaped close to a sinusoid. The output capacitor can filter the switching frequency ripple and can store energy so that the current provided to the LED array 420 (via B) can be substantially dc. It will be understood that although the term "boost circuit" is used herein, the circuit stage 715 may also be described using other terminology, such as a buck circuit, a flyback circuit, or SEPIC circuit. It will be further understood that other types of driver circuits 705 may also be used. Further, in some embodiments according to the invention, other arrangements of LEDs, such as separately controlled strings or banks of LEDs and/or various parallel and series combinations of LEDs in the different strings or bank as well as within specific segments of LEDs in a string or bank are used.

As described herein, in some embodiments according to the invention, a solid state lighting driver circuit can be electrically coupled to, but separated from, a solid state light emitting device. For example, in some embodiments according to the invention, solid-state lighting driver circuit can be located within a covered recess of an electrical connector, whereas the solid-state lighting device can be remotely located in a solid-state lighting housing that is separated from the covered electrical connector. In such arrangements, the solid-state lighting driver circuit can be electrically coupled to a solid-state lighting device by a flexible wire. Use of the flexible wire can promote ease of installation of the lighting apparatus by allowing the electrical connector to be installed in a standardized electrical fixture without simultaneously manipulating the solid-state lighting housing. Rather, the solid-state lighting housing may be installed separately from the electrical connector. Furthermore, heat management may be improved by housing the solid-state lighting driver circuit and the solid-state lighting device in separate remote structures.

For example, in some embodiments according to the invention, a solid state lighting apparatus can include an electrical connector that is configured to couple to a standardized electrical fixture, where the electrical connector provides a recess therein. A cover can eb coupled to the electrical connector to cover the recess, where the cover can include an opening. A solid state lighting driver circuit can be located beneath the cover to prevent outside access to the solid state lighting driver circuit to meet a standardized electrical safety certification. At least one flexible wire can be electrically coupled to the solid state lighting driver circuit and pass through the opening.

In some embodiments according to the invention, the cover is configured to electrically isolate the solid state lighting driver circuit from a handler. In some embodiments according to the invention, the cover can further include at least one feature that is configured to promote releasably coupling the solid state lighting apparatus to/from the standardized electrical fixture. In some embodiments according to the invention, the at least one feature can be at least one raised portion of an outer surface of the cover. In some embodiments according to the invention, the at least one feature can be a roughened outer surface of the cover.

In some embodiments according to the invention, the opening in the cover is sized to accommodate the insertion of the at least one flexible wire through the opening. In some embodiments according to the invention, the apparatus can further include an interface that is configured to irreversibly couple the electrical connector to the cover during assembly of the solid state lighting apparatus. In some embodiments according to the invention, the interface can provide latching, adhering, and/or fusing the cover to the electrical connector. In some embodiments according to the invention, the interface can be configured to prevent touching of the solid state lighting driver circuit from outside the apparatus to meet a standardized electrical safety certification. In some embodiments according to the invention, the solid state lighting driver circuit can be entirely within a space formed by the cover and the recess.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

It will be understood that, as used herein, the term light emitting diode may include a light emitting diode, laser diode and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive layers.

In the drawings and specification, there have been disclosed typical preferred embodiments of the inventive subject matter and, although specific terms are employed, they are used in a generic and descriptive sense only and not for purposes of limitation, the scope of the inventive subject matter being set forth in the following claims.

What is claimed:

1. A solid state lighting apparatus comprising:
   an electrical connector configured to couple to a standardized electrical fixture, the electrical connector providing a recess therein;
   a cover coupled to the electrical connector to cover the recess;
   a solid state lighting driver circuit beneath the cover;
   a solid state lighting housing, separate from the electrical connector and cover, and configured to house a solid state light emitting device;
   at least one flexible wire extending uninterrupted between the cover and the solid state lighting housing and electrically coupling the solid state lighting driver circuit to the solid state light emitting device; and
   a strain relief coupled to the at least one flexible wire between the cover and the electrical connector,
   wherein the solid state lighting housing is configured to hang freely from the at least one flexible wire during installation of the electrical connector, and
   wherein the strain relief is configured to support the weight of the solid state lighting housing when hanging freely.

2. The apparatus of claim 1 wherein the cover is configured to enclose the solid state lighting driver circuit to electrically isolate the solid state lighting driver circuit from a handler.

3. The apparatus of claim 1 wherein the cover further comprises:
   at least one feature configured to promote releasably coupling of the electrical connector to/from the standardized electrical fixture.

4. The apparatus of claim 3 wherein the at least one feature comprises at least one raised portion of an outer surface of the cover.

5. The apparatus of claim 3 wherein the at least one feature comprises a roughened outer surface of the cover.

6. The apparatus of claim 1 wherein the cover includes an opening sized to accommodate insertion of the at least one flexible wire.

7. The apparatus of claim 1 further comprising:
   an interface configured to irreversibly couple the electrical connector to the cc during assembly of the solid state lighting apparatus.

8. The apparatus of claim 7 wherein the interface comprises latching, adhering, and/or fusing the cover to the electrical connector.

9. The apparatus of claim 7 wherein the interface is configured to prevent access to the solid state lighting driver circuit to meet a standardized electrical safety certification.

10. The apparatus of claim 1 wherein the strain relief comprises a knot in the at least one flexible wire inside the cover sized to prevent the knot from passing through an opening in the cover.

11. The apparatus of claim 1 wherein the electrical connector includes an extension coupled to the electrical connector and configured to provide an extended recess that is enclosed by the cover.

12. The apparatus of claim 1 wherein the solid state lighting driver circuit is entirely within a space formed by the cover and the recess.

13. The apparatus of claim 1 wherein the at least one flexible wire is configured to solely bear a weight of the solid state lighting housing during installation of the electrical connector.

14. The apparatus of claim 1 further comprising:
   a wet-location compliant lens covering the solid state light emitting device in the housing.

15. The apparatus of claim 14 wherein the solid state lighting apparatus is UL 1590 certified.

16. The apparatus of claim 14 wherein the wet-location compliant lens comprises a polycarbonate material.

17. The apparatus of claim 14 wherein the wet-location compliant lens comprises an outer flange configured to extend laterally towards an interior surface of the housing.

18. The apparatus of claim 17 further comprising:
   a compressible seal between an edge of the outer flange and the interior surface of the housing,
   wherein the outer flange is spaced apart from the interior surface to accommodate the insertion of the compressible seal.

19. The apparatus of claim 1 wherein the housing includes a plurality of openings configured to transfer heat away from the solid, state light emitting device.

20. An apparatus comprising:
   a cover configured to enclose a solid state lighting driver circuit in a space that excludes a solid state light emitting device, to prevent touching the solid state lighting driver circuit from outside the cover;
   at least one feature of an outer surface of the cover configured to face the solid state light emitting device, the at least one feature configured to promote gripping by a handler of the cover; and
   an opening in the outer surface of the cover configured to face the solid state light emitting device,
   wherein the solid state lighting driver circuit is configured to be powered via an electrical connector when releasably coupling the electrical connector to a standardized electrical fixture,
   wherein the opening is exposed to a handler during installation of the apparatus in the standardized electrical fixture;

wherein the standardized electrical fixture comprises at least one of an Edison style fixture or a bayonet style fixture, wherein the cover is configured to be connected by at least one flexible wire extending uninterrupted through the opening to the solid state light emitting device that is positioned separate from the cover, and wherein the solid state light emitting device is configured to hang freely from the flexible wire during installation of the electrical connector.

21. The apparatus of claim 20 wherein the cover is configured to electrically isolate the solid state lighting driver circuit from the handler.

22. The apparatus of claim 20 wherein the at least one feature comprises at least one raised portion of the outer surface of the cover.

23. The apparatus of claim 20 wherein the at least one feature comprises a roughened outer surface of the cover.

24. The apparatus of claim 20 wherein the opening is sized to accommodate insertion of two 18 gauge flexible wires through the opening.

25. The apparatus of claim 20 further comprising:
an interface of the cover configured to irreversibly couple the cover to the electrical connector during assembly of a solid state lighting apparatus including the cover.

26. The apparatus of claim 25 wherein the interface is configured to prevent touching the solid state lighting driver circuit through the solid state lighting apparatus to meet a standardized electrical safety certification.

27. The apparatus of claim 20 wherein the electrical connector is configured to be releasably coupled to the standardized electrical fixture by screwing a base portion of the electrical connector into the standardized electrical fixture.

28. The apparatus of claim 20 wherein the standardized electrical fixture comprises an E5, E10, E11, E14, E17, E27, E29, E39, or E40 Edison fixture.

29. The apparatus of claim 20 wherein the standardized electrical fixture, comprises a B15d, BA15d, BA15s, BA20d, B21s-4, B22d, B24s-3, GU10, GZ10, or G24 bayonet fixture.

30. The apparatus of claim 20 wherein the at least one flexible wire is configured to solely bear a weight of the solid state lighting housing during installation of the electrical connector.

31. A solid state lighting apparatus comprising:
a solid state lighting housing, remotely positioned separate from an electrical connector and connected to the electrical connector by at least one flexible wire extending uninterrupted between the solid state lighting housing and the electrical connector, wherein the electrical connector is configured to releasably couple to a standardized electrical fixture;

a wet-location compliant lens configured to couple to the solid state lighting housing; and an opening in a surface of the solid state lighting housing, the opening being exposed to a handler during installation of the solid state lighting apparatus in the standardized electrical fixture, wherein the solid state lighting housing is configured to be installed separately from the electrical connector, wherein the solid state lighting housing is configured to hang freely from the at least one flexible wire during installation of the electrical connector, wherein the wet-location compliant lens comprises an outer flange laterally extending from a side of the wet-location compliant lens, and wherein the standardized electrical fixture comprises at least one of an Edison style fixture or a bayonet style fixture.

32. The apparatus of claim 31 wherein the wet-location compliant lens is configured to prevent an intrusion of liquid into the housing to meet a standardized electrical safety certification.

33. The apparatus of claim 32 wherein the wet-location compliant lens is UL 1590 certified.

34. The apparatus of claim 31 wherein the wet-location compliant lens comprises a polycarbonate material.

35. The apparatus of claim 31 wherein an outer edge of the outer flange protrudes from a side wall surface of the wet-location compliant lens about 2 mm to about 4 mm.

36. The apparatus of claim 31 further comprising:
a compressible seal between an outer edge of the outer flange and the interior surface of the solid state lighting housing, wherein the outer flange is spaced apart from the interior surface to accommodate the insertion of the compressible seal.

37. The apparatus of claim 31 wherein the standardized electrical fixture comprises an E5, E10, E11, E14, E17, E27, P29, E39, or E40 Edison fixture.

38. The apparatus of claim 31 wherein the standardized electrical fixture comprises a B15d, BA15d, BA15s, BA20d, B21s-4, B22d, B24s-3, GU10, GZ10, or G24 bayonet fixture.

39. The apparatus of claim 31 wherein the electrical connector comprises a base portion configured to be inserted into the standardized electrical fixture.

40. The apparatus of claim 31 wherein the base portion of the electrical connector is configured to be screwed into the standardized electrical fixture.

41. The apparatus of claim 31 wherein the at least one flexible wire is configured to solely bear a weight of the solid state lighting housing during installation of the electrical connector.

* * * * *

UNITED STATES PATENT AND TRADEMARK OFFICE
CERTIFICATE OF CORRECTION

PATENT NO. : 10,012,371 B2
APPLICATION NO. : 14/281173
DATED : July 3, 2018
INVENTOR(S) : Athalye et al.

Page 1 of 1

It is certified that error appears in the above-identified patent and that said Letters Patent is hereby corrected as shown below:

In the Claims

Column 14, Claim 7, Line 8: Please correct "cc" to read -- cover --

Signed and Sealed this
Ninth Day of October, 2018

Andrei Iancu
*Director of the United States Patent and Trademark Office*